United States Patent [19]

Mathur et al.

[11] Patent Number: 5,192,351
[45] Date of Patent: Mar. 9, 1993

[54] PRODUCTION OF DEHYDROXYLATED GLASS

[75] Inventors: Akshay Mathur; Lenwood D. Pye, both of Alfred, N.Y.

[73] Assignee: Alfred University, Alfred, N.Y.

[21] Appl. No.: 812,130

[22] Filed: Dec. 17, 1991

[51] Int. Cl.$^5$ ............................................ C03B 37/016
[52] U.S. Cl. ...................... 65/18.1; 65/3.11; 65/30.1; 65/900; 65/901; 501/12
[58] Field of Search ................ 65/17, 18.1, 30.1, 900, 65/901, 3.11; 501/12

[56] References Cited

U.S. PATENT DOCUMENTS

| | | | |
|---|---|---|---|
| 3,113,008 | 12/1963 | Elmer | 65/32.3 X |
| 4,203,744 | 5/1980 | Schultz et al. | 65/3.12 |
| 4,455,382 | 6/1984 | Wu | 501/2 |
| 4,772,305 | 9/1988 | Elmer | 65/30.1 |
| 4,883,521 | 11/1989 | Shimizu et al. | 65/17 |
| 4,937,208 | 6/1990 | Yamamoto | 501/12 |
| 4,943,542 | 7/1990 | Hayashi et al. | 501/12 |
| 4,979,973 | 12/1990 | Takita et al. | 65/18.1 |

OTHER PUBLICATIONS

C. J. Brinker et al., *Sol-Gel Science The Physical and Chemistry of Sol-Gel Processing* pp. 628–672.
K. Susa et al., "Reduction of Chlorine Content in Sol- Gel Derived Silica Glass," *Journal of Non-Crystalline Solids*, vol. 79, pp. 165–176 (1986).
T. H. Elmer, "Nitride Glass," *VII International Conference on Glass*, vol. 1 (1965).
M. Shimizu et al., "Reaction of CCl$_4$ with SiO$_2$ surfaces," *Journal of the American Ceremics Society*, vol. 54, pp. 271–272 (1971).
M. L. Hair et al., "Reaction of Chlorosilanes with Silica Surfaces," *Journal of Physical Chemistry*, vol. 73, No. 7, pp. 2372–2378 (1979).
T. H. Elmer "Dehydroxylation and Nitriding of Porous Glass by Means of Water-Soluble Nitrogen-Containing Organic Compounds," *Glastech. Ber.*, vol. 60, pp. 399–405 (1987).
T. H. Elmer "Chlorine Treatment of Nitrided Posous Glass," *Glastech. Ber.*, vol. 61, pp. 24–27 (1988) Nr. 1.

*Primary Examiner*—Robert L. Lindsay
*Attorney, Agent, or Firm*—Michael L. Goldman

[57] ABSTRACT

A substantially dehydroxylated glass is formed by impregnating a dry porous silica gel with a nitrogen-containing organic compound in an organic solvent capable of solubilizing that compound. The impregnated gel is then sintered in a non-oxidizing atmosphere to form a substantially dehydroxylated, fully-densified silica glass. The gel is typically formed by a sol-gel process. The nitrogen-containing organic compound can be guanidine compounds, urea, or mixtures thereof.

24 Claims, No Drawings

PRODUCTION OF DEHYDROXYLATED GLASS

FIELD OF THE INVENTION

The present invention relates to the chemical dehydroxylation of a dry, glass-forming gel, typically produced by the sol-gel glass-forming process.

BACKGROUND OF THE INVENTION

Silica glass has been heavily utilized in the optical, semiconductor, electronic, and chemical industries due to its excellent heat resistance, corrosion resistance, and optical properties.

Historically, the silica glass has been produced by melting natural quartz in an electric furnace or with an oxyhydrogen flame. Alternatively, silica glass can be made by subjecting silicon tetrachloride to high-temperature oxidation and melting in an oxyhydrogen flame or a plasma flame. These techniques, however, are expensive, because they require temperatures of 2000° C. or higher. To withstand such high temperatures and form a quality product, durable starting materials must be utilized.

More recently, silica glass has been synthesized at low temperatures using the sol-gel process. In accordance with this technique, water is added to a silicon alkoxide represented by the formula:

$$Si(OR)_4$$

where
R is an alkyl group, and/or a silicon alkoxide polycondensate represented by the formula:

$$(RO)_3Si-[OSi(OR)_2]_n-OSi(OR)_3$$

where
R is an alkyl group and n is zero or an integer of 1 to 8.

This aqueous silicon alkoxide or alkoxide polycondensate is then hydrolyzed to form a silica sol by adding an alcohol to produce a uniform system of the silicon alkoxide, water, and alcohol. The silica sol is then allowed to stand and form a gel which is dried and sintered in a suitable atmosphere to form a silica glass.

Despite the advantages of the sol-gel process, there are still problems associated with it. For example, the presence of —Si—OH groups at the surface of the gels, made in accordance with this process, can cause bloating and foaming of the gel during the final stages of sintering. Generally, some dehydroxylation takes place during the early stages of sintering according to the following reaction:

$$-Si-OH + -Si-OH \rightarrow -Si-O-Si- + H_2O$$

Even with such dehydroxylation, the final sintered glass still has as much as 2000-4000 ppm of —Si—OH groups. Moreover, subsequent heating of the glass product to its softening point, during fiber drawing or sealing, may cause bloating. High hydroxyl levels are also detrimental to optical communication uses where infrared radiation transmission is vital. The need for dehydroxylation is extensively discussed in C. J. Brinker et al., *Sol-Gel Science-The Physical and Chemistry of Sol-Gel Processing*, pp. 628-72 (1990).

One approach to the hydroxyl problem has been the treatment of the gel, during sintering, with chlorine gas at 800° C. and then with oxygen at 1000°-1100° C. See K. Susa et al., "Reduction of Chlorine Content in Sol-Gel Derived Silica Glass," *Journal of Non-Crystalline Solids*, vol. 79, pp. 165-76 (1986). This technique, however, complicates the sintering step and requires specialized handling systems for the chlorine gas.

Dehydroxylation has also been desired for silica glass derived from non-sol-gel techniques. For example, fully dense alkali borosilicate glass, which has been made porous by heating and then acid leaching, has been treated with a variety of dehydroxylation agents. Such glass is different from dried, unsintered gels, (typically produced by the sol-gel technique) in that the surface around the pores of heat treated/acid leached glass is still glass. In gels, the gelatinous material surrounding the pores is not a fully-formed glass, and, if improperly dehydroxylated, is susceptible to cracking when sintered. By contrast, porous silica glass is unlikely to encounter such problems, because the glass surrounding the pores is relatively strong. Due to these differences in properties, the dehydroxylation procedures for porous glass is not directly transferable to the treatment of dried gels.

In T. H. Elmer, "Nitride Glass," *VII International Conference on Glass*, vol. 1 (1965), porous silica glass is exposed to ammonia at elevated temperatures (i.e. 800° C. or higher) to effect dehydroxylation according to the following reaction:

$$-Si-OH + NH_3 \rightarrow -Si=NH + H_2O$$

This technique, however, suffers from many of the same problems as those discussed above with respect to Susa. Where the nitrogen-doped product resulting from such ammonia treatment is undesirable, that product may be subsequently contacted with heated chlorine to remove amine groups according to the following reaction scheme:

$$-Si-OH + -Si-OH \rightarrow -Si-O-Si- + H_2O$$

$$H_2O + Cl_2 \rightarrow 2HCl + O_2$$

$$-Si-OH + HCl \rightarrow Si-Cl + H_2O$$

$$-Si=NH + -Si-Cl \rightarrow N(Si-)_3 + HCl$$

See T. H. Elmer, "Chlorine Treatment of Nitrided Porous Glass," *Glastech. Ber.*, 61, pp. 24-27 (1988).

It has also been known to use chlorine gas alone at elevated temperatures (i.e. above 700° C.) to achieve dehydroxylation according to the following reaction scheme, as discussed in M. L. Hair et al., "Reaction of Chlorosilanes with Silica Surfaces," *Journal of Physical Chemistry*, vol. 73, no. 7, pp 2372-78 (1969):

$$2(-Si-OH) + 2Cl_2 \rightarrow 2(-Si-Cl) + O_2$$

Again, however, these techniques complicate the sintering step and require specialized gas-handling systems.

Dehydroxylation has also been carried out with carbon tetrachloride, as discussed in M. Shimizu et al., "Reaction of CCl$_4$ with SiO$_2$ Surfaces," *Journal of the American Ceramics Society*, vol. 54, pp. 271-72 (1971), and with chlorosilanes, as set forth in M. L. Hair et al., "Reaction of Chlorosilanes with Silica Surfaces," *Journal of Physical Chemistry*, vol. 73, no. 7, pp. 2372-78 (1969).

In both U.S. Pat. No. 4,772,305 to T. H. Elmer and T. H. Elmer "Dehydroxylation and Nitriding of Porous Glass by Means of Water-Soluble Nitrogen-Containing Organic Compounds," *Glastech. Ber.*, vol. 60, pp. 399–405 (1987), an impregnation technique of dehydroxylation is proposed in place of the above-discussed gas treatment/sintering procedure. This impregnation process involves immersing porous silica glass in an aqueous solution of a nitrogen-containing organic compound, such as urea or a guanidine compound. The impregnated porous glass is then heated in a non-oxidizing atmosphere to dissociate nitrogen from the organic compound, combine the nitrogen with the glass, and expel hydroxyl groups. The glass may then be further heated to consolidate it to a non-porous condition. However, when utilized in conjunction with silica gels, this technique is not capable of producing a satisfactory glass product, because of cracking which occurs during sintering.

SUMMARY OF THE INVENTION

The process of the present invention relates to the preparation of a substantially dehydroxylated glass by impregnating a dry porous silica gel with an nitrogen-containing organic compound and then sintering the impregnated gel in a non-oxidizing atmosphere. To achieve such impregnation, the nitrogen-containing organic compound is dispersed in an organic solvent in which that compound is soluble. The nitrogen-containing organic compound contains an amine-substituted carbon atom, such as urea, a guanidine compound, or mixtures thereof, while the organic solvent is preferably methanol. It is particularly desirable for the dry silica gel to be doped with a transition metal or a rare earth metal. When doped with neodymium, the dehydroxylated silica glass product can be used in laser applications.

Typically, the brittle, weak gels treated by the process of the present invention are prepared by the sol-gel process. This involves the formation of a mixture of silicon alkoxide, water, and optionally, any other desired metal alkoxides. The mixture is then agitated to convert the alkoxide(s) to a network of corresponding oxides suitable for gelation. The mixture containing this network of corresponding oxides is placed in a mold and allowed to set for sufficient time to form a gel. The gel is then dried either under hypercritical conditions to form a silica aerogel or under conventional slow conditions to form a xerogel.

By use of the dehydroxylation technique of the present invention, the resulting silica glass has a hydroxyl level of less than 100 ppm, preferably less than 10 ppm. This result is achieved without use of specialized gas handling systems and without causing cracking in the final glass product. At such low hydroxyl levels, a glass of this high quality is particularly useful in laser applications.

DETAILED DESCRIPTION OF THE INVENTION

The present invention relates to the production of substantially dehydroxylated silica glass by impregnation of a dry porous, silica gel with a nitrogen-containing organic compound in an organic solvent in which the compound is soluble. The impregnated gel is then sintered in a non-oxidizing atmosphere to form a substantially dehydroxylated, fully-densified silica glass.

The nitrogen-containing organic compound used during impregnation contains an amine-substituted carbon atom in which amine substituent groups replace the deleterious hydroxyl groups in the final glass product. Suitable nitrogen-containing organic compounds are guanidine compounds, urea, or mixtures thereof. The guanidine compounds may be guanidine hydrochloride, guanidine carbonate, and guanidine nitrate. Of the above nitrogen-containing organic compounds, guanidine hydrochloride is particularly preferred, because it removes hydroxyl groups most effectively.

The organic solvent must be selected to effect solubilization of the nitrogen-containing organic compound. Methanol is a suitable solvent. The concentration of the nitrogen-containing organic compound in the organic solvent is 10–35 volume percent, preferably 30 volume percent.

Impregnation is carried out at a temperature of 20°–50° C., preferably 40°–50° C. An impregnation pressure of about 1 atmosphere is preferably utilized. Generally, effective impregnation will be achieved in 10–48 hours, preferably 24 hours.

After impregnation, it may be desirable to dry the impregnated gel at ambient conditions for 24–48 hours, preferably for 24 hours.

Sintering is carried out at 1200°–1450° C., preferably 1300°–1400° C., and at a pressure of about 1 atmosphere is preferred. One suitable sintering schedule involves heating the impregnated gel from room temperature to 300° C. at a rate of 30° C. per hour, holding the gel at 300° C. for 2 hours, heating the gel to a temperature of 1300°–1400° C. at a rate of 120° C. per hour, holding the heated gel at 1300°–1400° C. for 0.5 hours, and slowly reducing the temperature. To prevent reformation of hydroxyl groups, sintering must be carried out in a non-oxidizing environment. Suitable gaseous atmospheres contain inert gases, including nitrogen, argon, helium, and mixtures thereof, preferably nitrogen.

As a result of sintering, the gel is transformed to a fully-densified glass, usually with a density of 2.2–2.6 kilograms per meter$^3$, depending upon the type of dopant utilized. That product is also substantially dehydroxylated from a hydroxyl level of 2000–5000 ppm, when the gel is sintered in the absence of an impregnation step, to a level of less than 100 ppm, preferably less than 10 ppm, when the gel is treated in accordance with the present invention.

Impregnation does not involve any chemical change in the dry gel being treated. Instead, it involves the organic solvent carrying the nitrogen-containing organic compound into the gel through its pores. During sintering, the nitrogen-containing organic compound is decomposed to ammonia. The ammonia then reacts with hydroxyl groups as follows:

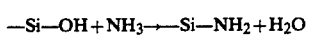

When the gel, however, is impregnated with guanidine hydrochloride, which decomposes to ammonia and hydrogen chloride, the hydrogen chloride reacts as follows with the hydroxyl groups:

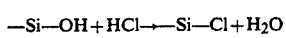

The —Si—Cl bond is, however, weak and readily decomposes at elevated temperatures to an —Si—O— linkage.

Typically, the gels treated by the above-described impregnation/sintering process are produced by the sol-gel technique. This process involves forming a sol of silicon alkoxide, water, and, optionally, alkoxides of other metals whose oxide form is desired in the final glass product. This sol mixture is agitated to convert the metal alkoxides to a network of corresponding metal oxides, suitable for gelation. The mixture containing the network of corresponding metal oxides is molded for sufficient time to form a gel. The gel is then dried to a level suitable for impregnation treatment as described above.

Silicon alkoxides may be prepared by reacting metal halides and alcohols as follows:

$$SiCl_n + nROH \rightarrow Si(OR)_n + nHCl,$$

where
R is hydrocarbon group, and
n is 4

Starting materials for silicon alkoxides are tetraethyl orthosilicate and tetramethyl orthosilicate. Aside from alkoxides of silicon, this procedure can be utilized additionally to form alkoxides of aluminum, phosphorus, zirconium, boron, germanium, titanium, and calcium. Alkoxides of these metals may be used in a mixture with silicon alkoxides when it is sought to form a product containing these metals. Alkoxides of alkali and alkaline earth metals, which can similarly be produced and mixed with silicon alkoxides, are formed by the following reaction sequence:

$$M + nROH \rightarrow M(OR)_n + (n/2)M_2,$$

where
M is a metal alkoxide,
R is a hydrocarbon radical, and
n is generally the valence of M. Generally, silicon alkoxide is used at a level to produce a final glass product with a silicon dioxide level of 40-100 weight percent, preferably 100 weight percent.

It is particularly desirable to produce a glass doped with a rare earth metal or a transition metal. Suitable dopants of this type are neodymium, erbium, samarium, europium, holmium, ytterbium, and cerium. For laser applications, neodymium is particularly suitable for the following reasons: (1) The absorption spectrum of 350-900 nanometers overlaps with that of the xenon flash lamp of a laser to achieve efficient energy transfer; (2) for confinement fusion experiments, neodymium glass lasers achieve output wavelengths of 1.06 micrometers to effect good plasma coupling efficiencies; (3) the stimulated emission cross-section for neodymium laser transmission achieves gain in most media without severe amplified spontaneous emission problems; and (4) the optical characteristics of neodymium are well understood, so the composition of the glass can be varied to achieve particular properties. Such dopants are mixed with the silicon alkoxide in the form of salts and are utilized at a level of 0.25-5.0 weight percent, preferably 2.5 weight percent of the metal alkoxide(s) to which the dopant is being added.

As a result of agitation and both water and alcohol condensation, a network of oxide(s) of the metal corresponding to the alkoxide(s) is formed. Possible reactions include the following:

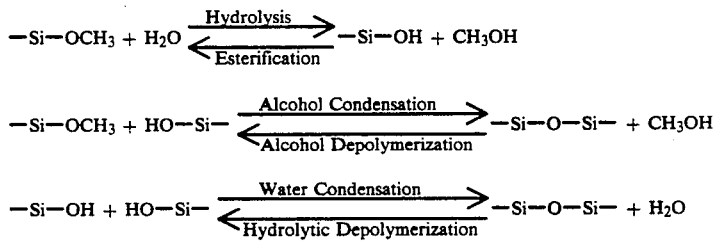

By holding the network-containing sol in a mold for sufficient time, a gel is formed. Rapid hydrolysis and longer gelation times are achieved by addition of an acid catalyst (e.g., hydrogen chloride, nitric acid, or acetic acid), while faster condensation rates and shorter gelation times are accomplished with a base catalyst (e.g., NH₄OH). Generally, gel formation is achieved at temperatures of 20°-80° C., preferably 40° C.

Once a gel is formed, it must be dried. By drying under hypercritical conditions (i.e., above the critical temperature and pressure of the liquid within the gel), a dried gel known as an aerogel is formed. Under such conditions, a liquid-vapor interface does not exist, and the supercritical fluid within the gel pores can be vented without developing capillary forces that can weaken the aerogel. For alcohol-water mixtures usually found in the gel, supercritical drying is at a temperature of 290°-310° C., preferably 300° C., and at a pressure of 136-184 atmospheres, preferably 163 atmospheres. Under these conditions, 12-18 hours are generally required to dry the gel to a porous aerogel with substantially no interstitial liquid. The aerogel, having a porosity of at least 80% and a density of about 0.2 grams per cubic centimeter, can then be subjected to the above-described sequence of impregnation and sintering.

The aerogels produced through hypercritical drying are brittle and weak. It is, therefore, often advantageous to strengthen the aerogels by heating them in air at 1000°-1100° C. prior to impregnation. This step can be utilized to transform the aerogels to a density of 0.8-1.25 grams per cubic centimeter, preferably 1.0 grams per cubic centimeter and a surface area of about 325-225 square centimeters per gram, preferably 300 square centimeters per gram.

It is particularly preferred to impregnate aerogels in accordance with the process of the present invention. However, the more conventionally-produced xerogels may also be treated by the process of the present invention. Xerogels are prepared by drying the gel at a temperature which slowly rises from room temperature to the sintering temperature under atmospheric pressure. Typically, this temperature increase is at a rate of about 50° C. per hour and takes place over 18-20 hours. Following conventional drying, the xerogel has a surface area of 120-160 square centimeters per gram, preferably 150 square centimeters per gram. Generally, xerogels are less porous than aerogels which makes the former more prone to cracking during sintering. To reduce the likelihood of such cracking N,N-dimethylformamide, a drying control additive, can be included in the sol when xerogels are being produced.

EXAMPLES

For Examples 1-4, neodymium doped silica aerogels, in the form of disks 40 mm in diameter and 7.0 mm in thickness, were produced by known techniques. The gels, having a density of about 0.25 gm/cc, were heated at 1100° C. for sufficient time to consolidate them to a density between 0.9-1.1 gm/cc.

The porous gels were then immersed in impregnation solutions of guanidine hydrogen chloride, guanidine nitrate, or urea in methanol and allowed to soak for 24 hours. The impregnated samples were dried in air and then sintered in a nitrogen atmosphere by heating at a rate of 0.5° C./min to a temperature of 850° C., holding at 850° C. for 4.0 hours, heating at a rate of 2° C./min to a final sintering temperature of 1350° C., holding at the final sintering temperature for 15 minutes, and cooling to room temperature.

EXAMPLE 1

An impregnation solution was prepared by dissolving 10 gms of guanidine hydrogen chloride in 20 gms of methyl alcohol. The test samples were immersed in that solution at room temperature for 24 hours, removed from the solution, dried, and sintered.

The sintered product was then analyzed with an infrared spectraphotometer and was found to have a residual hydroxyl group content below that device's limit of detection. This glass product contained water in an amount measurable in parts per billion, was fully dense, and contained no cracks or visible flaws.

EXAMPLE 2

An impregnation solution was prepared by dissolving 10 gms of guanidine hydrogen chloride in 30 gms of methyl alcohol. The test samples were immersed in that solution at room temperature for 24 hours, removed from the solution, dried, and sintered. The sintered product was analyzed in accordance with Example 1 and was found to have 90 ppm of residual hydroxyl groups.

EXAMPLE 3

An impregnation solution was prepared by dissolving 10 gms of guanidine nitrate in 20 gms of methyl alcohol. The test samples were immersed in that solution at room temperature for 24 hours, removed from the solution, dried, and sintered. The sintered product was analyzed in accordance with Example 1 and was found to have 45 ppm of residual hydroxyl groups. This glass product had no cracks or visible flaws.

EXAMPLE 4

An impregnation solution was prepared by dissolving 10 gms of urea in 30 gms of methyl alcohol. The test samples were immersed in that solution at room temperature for 24 hours, removed from the solution, dried, and sintered. The sintered product was analyzed in accordance with Example 1 and was found to have 30 ppm of residual hydroxyl groups. This glass product had no cracks or visible flaws.

EXAMPLE 5

Four aerogel samples having a density of 1.0 grams per cubic centimeter were impregnated with a 20%, 40%, 50%, or 60% guanidine hydrogen chloride in water solution for a period of about 12 hours. The impregnated aerogels were then dried for 24-48 hours in air. After drying, the aerogels were sintered by heating them from room temperature to 180° C. at a rate of 50° C. per hour and then heating to a final sintering temperature at a rate of 100° C. per hour in a nitrogen atmosphere. In each case, the samples cracked catastrophically.

Although the invention has been described in detail for the purpose of illustration it is understood that such detail is solely for that purpose and variations can be made therein by those skilled in the art without departing from the spirit and the scope of the invention which is defined by the following claims.

What is claimed:

1. A process of preparing a substantially dehydroxylated glass comprising:
   impregnating a dry porous silica gel with a quanidine compound, urea, or a mixture thereof in an organic solvent which the quanidine compound, urea, or mixture thereof is soluble in and
   sintering the impregnated gel in a non-oxidizing atmosphere to form a substantially dehydroxylated silica glass.

2. A process according to claim 1, wherein the dry silica gel further comprises a transition metal or a rare earth metal dopant.

3. A process according to claim 2, wherein the dopant is neodymium and the dehydroxylated silica glass is homogeneous $Nd_2O_3$—$SiO_2$ glass.

4. A process of preparing a substantially dehydroxylated glass comprising:
   impregnating a dry porous silica gel with a quanidine compound, urea, or mixtures thereof in methanol, wherein the silica gel is doped with a transition metal or a rare earth metal;
   sintering the impregnated gel in a non-oxidizing atmosphere to form a substantially dehydroxylated silica glass containing less than 100 ppm of hydroxyl groups.

5. A process according to claim 1, wherein the quanidine compounds are selected from the group consisting of quanidine hydrochloride, quanidine carbonate, and quanidine nitrate.

6. A process according to claim 1, wherein the dehydroxylated silica glass contains less than 100 ppm of hydroxyl groups.

7. A process according to claim 1, wherein the organic solvent is methanol.

8. A process according to claim 1, wherein said impregnating is at 40°-50° C. and 1 atmosphere.

9. A process according to claim 1, wherein said sintering is at 1300°-1400° C. in an atmosphere containing substantially only nitrogen.

10. A process according to claim 1, wherein the dried gel is an aerogel.

11. A process according to claim 1, wherein the dried gel is a xerogel.

12. A process of preparing a substantially dehydroxylated glass comprising:
    forming a mixture of silicon alkoxide and water;

agitating the mixture to convert the alkoxide to a network of corresponding oxide suitable for gelation;

molding the mixture containing the network of corresponding oxide for sufficient time to form a silica gel;

drying the silica gel;

impregnating the dry silica gel with a quanidine compound, urea, or a mixture thereof in an organic solvent which the quanidine compound, urea, or mixture thereof is soluble in; and sintering the impregnated silica gel in a non-oxidizing atmosphere to form a substantially dehydroxylated silica glass.

13. A process according to claim 12, wherein the mixture of silicon alkoxide and water further comprises a transition metal or a rare earth metal dopant.

14. A process according to claim 13, wherein the dopant is neodymium and the dehydroxylated silica glass is homogeneous $Nd_2O_3$—$SiO_2$ glass.

15. A process according to claim 4, wherein the dopant is neodymium and the dehydroxylated silica glass is homogeneous $Nd_2O_3$—$SiO_2$.

16. A process according to claim 12, wherein the quanidine compound is selected from the group consisting of quanidine hydrochloride, quanidine carbonate, and quanidine nitrate.

17. A process according to claim 12, wherein the dehydroxylated silica glass contains less than 100 ppm of hydroxyl groups.

18. A process according to claim 12, wherein the organic solvent is methanol.

19. A process according to claim 12, wherein said impregnating is at 40°–50° C. and 1 atmosphere.

20. A process according to claim 12, wherein said sintering is at 1300°–1400° C. in an atmosphere containing substantially only nitrogen.

21. A process according to claim 12, wherein said drying is under hypercritical conditions at 290°–310° C. and 136–184 atmospheres to form an aerogel.

22. A process according to claim 12, wherein said drying forms a xerogel by slowly increasing temperature to that of said sintering at substantially atmospheric pressure.

23. A process according to claim 12, wherein the mixture further comprises alkoxides selected from the group consisting of titanium, aluminum, zirconium, boron, germanium, phosphorus, calcium, and mixtures thereof.

24. A process according to claim 21 further comprising:

strengthening the aerogel by heating it to 1000°–1100° C. prior to impregnating.

* * * * *